United States Patent [19]

Hansen et al.

[11] Patent Number: 4,614,121
[45] Date of Patent: Sep. 30, 1986

[54] ELECTROMAGNETIC FLOW METER

[75] Inventors: Henning M. Hansen; Hans E. Jacobsen; Konstantin Lassithiotakis, all of Nordberg; John Nyrup, Sonderborg, all of Denmark

[73] Assignee: Danfoss A/S, Nordborg, Denmark

[21] Appl. No.: 691,452

[22] Filed: Jan. 14, 1985

[30] Foreign Application Priority Data

Jan. 17, 1984 [DE] Fed. Rep. of Germany ....... 3401377

[51] Int. Cl.$^4$ ............................................. G01F 1/58
[52] U.S. Cl. ................................................ 73/861.12
[58] Field of Search ..................... 73/861.12, 861.15; 310/11

[56] References Cited

U.S. PATENT DOCUMENTS

| 3,824,856 | 7/1974 | Yard | 73/861.12 |
| 4,253,340 | 3/1981 | Schmoock | 73/861.12 |
| 4,281,552 | 4/1981 | Nissen et al. | 73/861.12 |
| 4,499,754 | 2/1985 | Akano et al. | 73/861.12 |

Primary Examiner—Herbert Goldstein
Attorney, Agent, or Firm—Wayne B. Easton

[57] ABSTRACT

An electromagnetic flow meter having a magnet system with pole shoes on opposite sides of a measuring tube, a magnetic coil arrangement with a yoke for the magnetic return circuit, and two measuring electrodes between the respective pole shoes. The magnetic coil is coaxial with the measuring tube and surrounds the pole shoes and the pole shoes are connected to the yoke by radially extending webs at opposite ends of the magnetic coil.

11 Claims, 5 Drawing Figures

ELECTROMAGNETIC FLOW METER

The invention relates to an electromagnetic flow meter of electrically insulating material, comprising a magnet system having on each of opposite sides of the measuring tube a pole shoe, a magnetic coil arrangement and a yoke for the magnetic return circuit, and two measuring electrodes disposed between the respective pole shoes.

In a known flow meter of this kind (EU OS 80 535), a ceramic measuring tube is provided with a flange at both ends. Adjacent to each pole shoe there is a magnetic coil of which the axis is radial and perpendicular to the axis of the measuring electrodes. A steel housing which receives the measuring tube in a bore under radial prestressing serves as a magnetic return circuit for the magnet system.

With such a construction, the magnet system projects considerably radially beyond the flanges of the measuring tube. This results in comparatively large external dimensions. In addition, the magnetic coils in many cases obstruct the passage of clamping bolts serving to clamp the flow meter tight between the flanges of two connecting tubes. The position and number of such clamping bolts is prescribed by the appropriate Standard Specification.

The invention is based on the problem of providing an electromagnetic flow meter of the aforementioned kind which has smaller dimensions under otherwise the same conditions and is much less hinderance to the application of clamping bolts.

This problem is solved according to the invention in that the magnetic coil arrangement is formed by a magnetic coil which is coaxial with the measuring tube and surrounds the pole shoes and that the pole shoes are connected to the yoke by radial webs at opposite ends of the magnetic coil.

In this construction, a single magnetic coil is coaxial with the measuring tube. An adequate number of windings can therefore be accommodated over a comparatively small radial extent. The special connection of the pole shoes to the yoke ensures that the effective field will pass radially through the measuring tube despite the tangentially wound magnetic coil. The smaller radial extent also results in shorter magnetic paths. This leads to lower magnetic voltage drops and to less temperature dependence of the permeability of the iron. Since the flow meter has smaller radial dimensions as a whole (in most cases it is not necessary to exceed the usual flange diameter of the measuring tube, or to exceed it only slightly), clamping bolts can be arranged around the flow meter in any desired position. In particular, the magnet system and the entire flow meter can be disposed entirely radially within the clamping bolts.

With particular advantage, the yoke has a cylindrical inner periphery and the radial webs are each formed by a segmented ring consisting of at least two circumferential sections. Because of the segmenting, these radial web rings are easily arranged on the measuring tube and then retained by the cylindrical inner circumference of the yoke in a manner such that the magnetic circuit is also closed. The ring form results in a large circumferential surface which minimises the magnetic resistance in the return path.

At least one of the radial web ring sections should be made in one piece with a pole shoe. This leads to a corresponding reduction in the number of components and to simplified assembly.

It is particularly favourable if the radial web rings are segmented substantially in the radial plane halving the pole shoes. There are no or only very few magnetic field lines in this plane that might have to be led away across the separation.

Advantageously, the yoke is formed by a cylindrical sleeve. This sleeve has a small radial extent and contributes to keeping the external dimensions to a minimum.

When using a measuring tube with end flanges, it is advisable for the radial web rings to have an external diameter equal to or larger than the flange diameter. The upper limit is dictated by the fact that the yoke does not obstruct the clamping bolts. In this way, the cylindrical inner circumference of the yoke can be axially pushed without effort over the measuring tube and the rest of the magnet system. If both diameters are equal, the yoke or the cylindrical sleeve may at the same time serve to exert radial prestressing on the flanges of the measuring tube.

With particular advantage, the radial webs have a cross section which increases radially outwardly. This gives a large circumferential surface and correspondingly low losses in the transition of the magnetic field lines from the radial web to the yoke.

Alternatively, the radial webs have an axial extension at the outer circumference. This saves magnetic material. In addition, a cavity for accommodating conductors is formed between the radial web and flange. In a preferred embodiment, the measuring electrode leads are guided in the space remaining between the pole shoes beyond the measuring tube up to one of the radial webs and then outwardly. In this case, one will require only one outlet aperture in the region of the radial webs without influencing the magnet system. In particular, if a free annular space is in any case available lengthwise of the radial webs, the conductors will be led in a very simple manner.

Further, at least one pole shoe may have a circumferential groove for inserting a measuring electrode lead. This lead can then be passed to the opposite electrode and both leads can be installed together.

It is particularly favourable if the magnetic coil is provided at the inner periphery with a cylindrical screen of electrically conductive material. This screen prevents capacitative coupling between the electrodes and the magnetic coil so that the tapped signal is not influenced in a capacitative sense. In addition, the screening can serve to hold the pole shoes in position at least during assembly.

Preferred examples of the invention will now be described in more detail with reference to the drawing, wherein.

Figure 1:
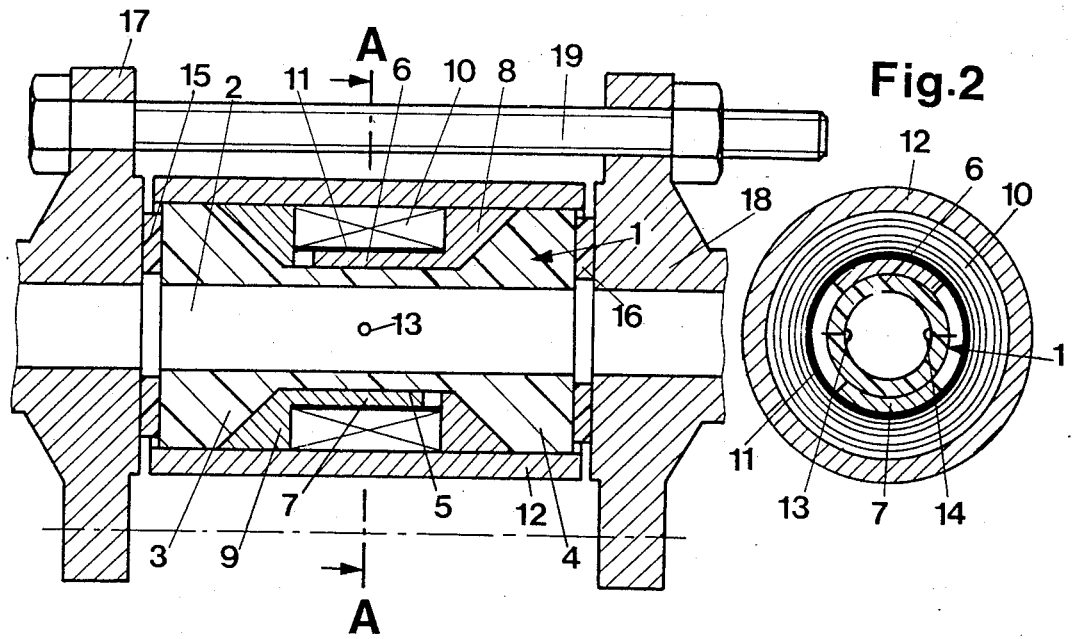
FIG. 1 is a longitudinal section through a flow meter according to the invention.
Figure 2:
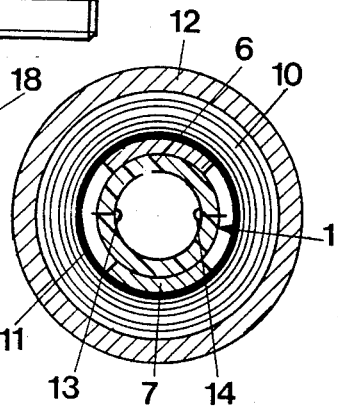
FIG. 2 is a section on the line A—A in FIG. 1.

According to FIGS. 1 and 2, a measuring tube 1 has an axial flow passage 2 and a flange 3 or 4 at each end. This measuring tube is of electrically insulating plastics material or preferably ceramic. An annular groove 5 is therefore left between the flanges.

Two pole shoes 6 and 7 lying against the measuring tube 1 are provided at opposite sides in the annular groove 5. The pole shoe 6 is continued by a radial web ring 8 and the pole shoe 7 by a radial web ring 9. Both the rings 8 and 9 are magnetically conductive material and are segmented in a radial plane passing through the measuring tube axis perpendicular to the plane of the drawing. Wound about both pole shoes 6 and 7 there is a magnetic coil 10 having its axis coincident with the measuring tube axis. Between the magnetic coil 10 and measuring tube 1 there is a screen 11 of electrically conductive material such as aluminium. A cylindrical sleeve serving as a yoke 12 for the magnetic return circuit has a cylindrical inner periphery equal to the outer periphery of the flanges 3 and 4 and the outer periphery of the radial web rings 8 and 9.

Two measuring electrodes 13 and 14 are disposed at the inner wall of the measuring tube 1 at opposite sides. Their axis is perpendicular to the plane of symmetry of the pole shoes 6, 7.

When assembling this flow meter, the pole shoes 6 and 7 with the associated radial web rings 8 and 9 are positioned and temporarily held by the screening 11. The magnetic coil 10 is then wound and finally the sleeve-like yoke 12 is pushed axially thereover.

In operation, the magnetic coil 10 concentric with the measuring tube 1 produces a magnetic field that passes radially through the passage 2 because the pole shoes 6 and 7 are connected at opposite ends of the magnetic coil 10 to the sleeve-like return yoke by way of the radial web rings 8 and 9. The flow meter is clamped between two connecting conduits 17 and 18 with interposed seals 15 and 16. Clamping bolts 19 arranged in a circle about the measuring tube axis pass through flanges of the connecting conduits. The sleeve-like yoke 12 has an external diameter which lies entirely radially within the clamping bolts.

Figure 3:
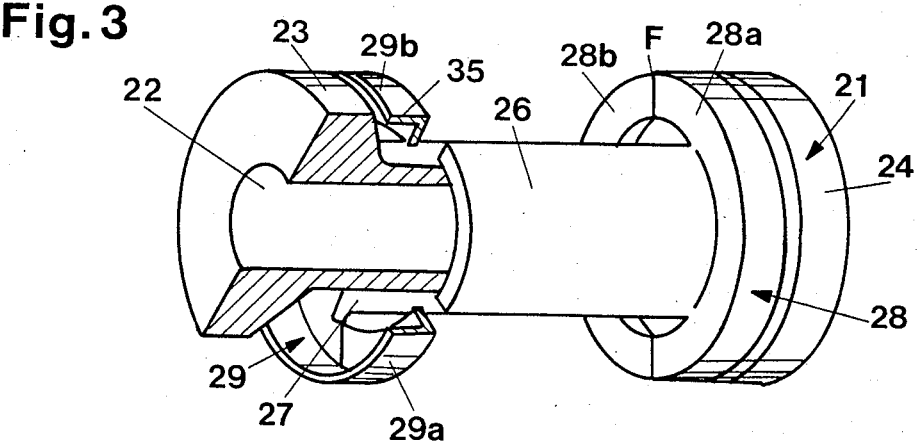
FIG. 3 is a perspective view of a different embodiment of measuring tube, pole shoes and radial web rings, partly in section.
Figure 4:
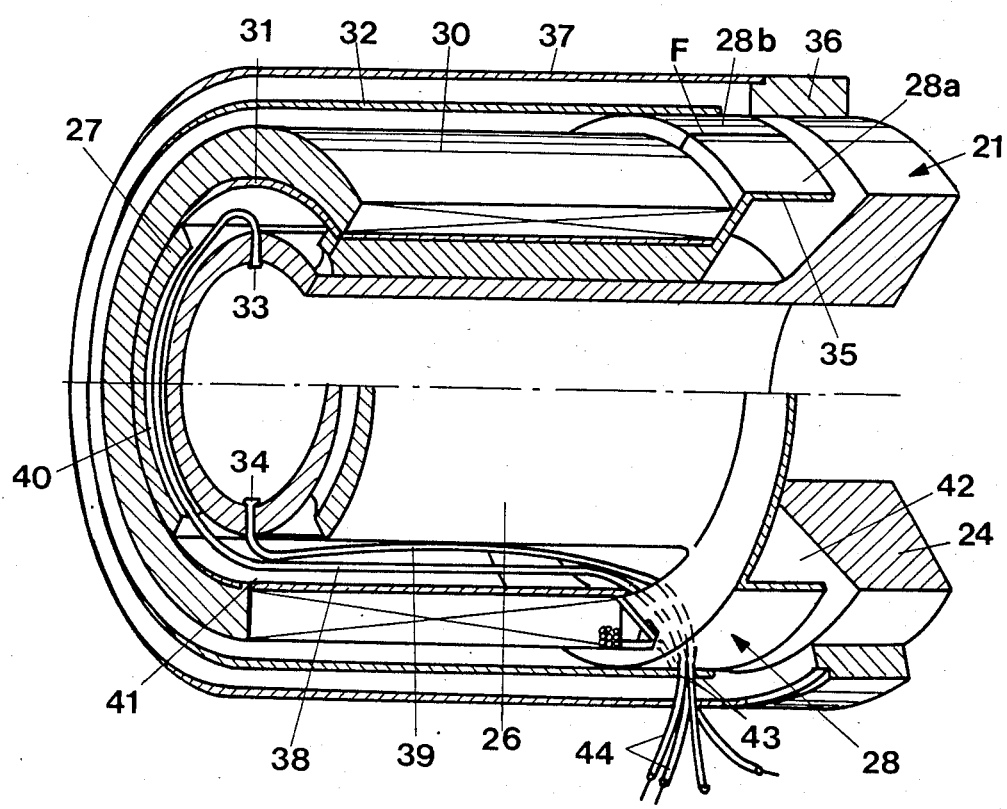
FIG. 4 is a part-sectional perspective view of the FIG. 3 embodiment after all the parts have been assembled.

In the FIGS. 3 and 4 embodiment, corresponding elements are given reference numerals increased by 20. It will be seen that the radial web rings 28 and 29 are segmented into two parts 28a, 28b or 29a, 29b along the dividing groove F, the part 28a being made in one piece with the pole shoe 26 and the part 29a in one piece with the pole shoe 27. At its radial flange, each radial web ring section has an axial extension 35 to give a large abutment face against the cylindrical sleeve serving as the yoke 32. In this case, the outer diameter of the radial web rings 28 and 29 is larger than that of the flanges 23, 24. Each flange is surrounded by a clamping ring 36 exerting radial prestressing and applied for example by being pushed on. The two clamping rings 36 are interconnected by a protecting sleeve 37. The two measuring electrodes 33 and 34 are each provided with a lead 38. The lead 38 passes through a circumferential groove 40 on the inside of the pole shoe 27. Both leads then pass through a space 41 kept free between the two pole shoes beyond the measuring tube 21. They also pass through a free space 42 formed between the radial web ring 28 and the flange 24, and through outlet apertures 43 in the ring 28, in the sleeve-like yoke 32 and in the protecting sleeve 37. The leads 44 for the magnetic coil 30 are passed through the same outlet apertures.

Assembly and construction in this embodiment are similar to FIGS. 1 and 2.

Figure 5:
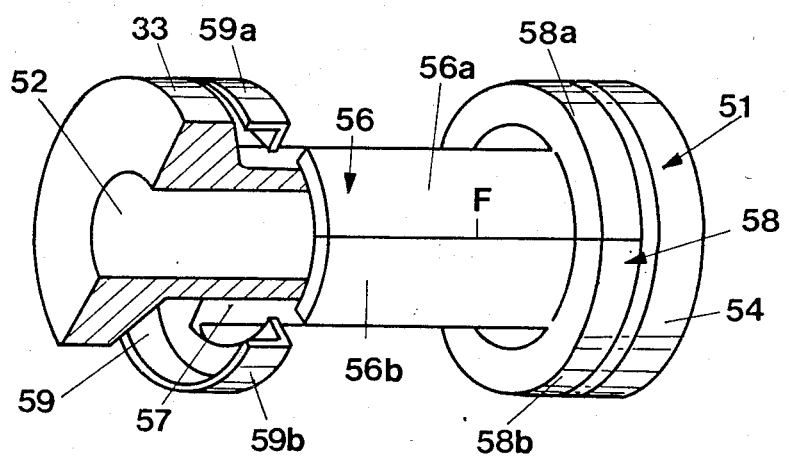
FIG. 5 is a view similar to FIG. 3 of a further modification.

In the FIG. 5 modification, corresponding parts have reference numerals increased by 50 over those of FIGS. 1 and 2 and by 30 over those of FIGS. 3 and 4. The main difference is that the radial web ring 58 is subdivided into two parts 58a and 58b of which the divisions F pass through the central plane of the pole since 56 so that the latter also consists of two parts 56a and 56b each connected to one half of the ring 58. The same applies to the radial web ring 59 having the two halves 59a and 59b with a dividing line F lying in the same plane.

We claim:

1. An electromagnetic flow meter, comprising, a measuring tube of an electrically insulating material, a magnet system including two pole shoes on diametrically opposite sides of said tube, a magnetic coil surrounding said shoes in coaxial relation to said tube, two measuring electrodes circumferentially between said pole shoes, a yoke for the magnetic return circuit surrounding said magnetic coil, each said pole shoe having at only one end thereof a radially and circumferentially extending web portion with said web portions being adjacent opposite ends of said coil connected to said yoke.

2. An electromagnetic flow meter according to claim 1 characterized in that said yoke has a cylindrical inner periphery and said radially extending web portions are formed by a segmented ring having at least two circumferential sections.

3. An electromagnetic flow meter according to claim 2 characterized in that at least one of said circumferential sections is made in one piece with one of said pole shoes.

4. An electromagnetic flow meter according to claim 2 characterized in that said circumferential sections are divided substantially in a radial plane halving said pole shoes.

5. An electromagnetic flow meter according to claim 1 characterized in that said yoke is formed by a cylindrical sleeve.

6. An electromagnetic flow meter according to claim 1 including flanges for said measuring tube end in straddling relation to said magnetic coil and said web portions.

7. An electromagnetic flow meter according to claim 1 characterized in that said pole shoe radially extending web portions have cross sections which increases radially outwardly.

8. An electromagnetic flow meter according to claim 1 characterized in that said pole shoe radially extending web portions have axially extending extensions at the outer peripheries thereof.

9. An electromagnetic flow meter according to claim 1 characterized in that one of said radially extending web portions is formed to provide an annular space surrounding said tube, leads for said measuring electrodes disposed in said space and extending axially between said shoes up to one or the other of said radially extending web portions and then outwardly.

10. An electromagnetic flow meter according to claim 9 characterized in that at least one of said pole shoes has a circumferentially extending groove into which is inserted said measuring electrode leads.

11. An electromagnetic flow meter according to claim 1 including cylindrical screening of electrically conductive material provided at the inner periphery of said magnetic coil.

* * * * *